US012675906B2

(12) United States Patent
Wang

(10) Patent No.: US 12,675,906 B2
(45) Date of Patent: Jul. 7, 2026

(54) METHOD AND APPARATUS FOR RECOGNIZING ROD-SHAPED OBJECT IN IMAGE, COMPUTER DEVICE, AND STORAGE MEDIUM

(71) Applicant: TENCENT TECHNOLOGY (SHENZHEN) COMPANY LIMITED, Shenzhen (CN)

(72) Inventor: Haichuan Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 323 days.

(21) Appl. No.: 18/618,186

(22) Filed: Mar. 27, 2024

(65) Prior Publication Data

US 2024/0233175 A1 Jul. 11, 2024

Related U.S. Application Data

(63) Continuation of application No. PCT/CN2023/113024, filed on Aug. 15, 2023.

(30) Foreign Application Priority Data

Sep. 23, 2022 (CN) .......................... 202211163449.0

(51) Int. Cl.
*G06T 7/73* (2017.01)
*G06F 16/23* (2019.01)
(Continued)

(52) U.S. Cl.
CPC .................. *G06T 7/74* (2017.01); *G06T 7/13* (2017.01); *G06V 20/58* (2022.01);
(Continued)

(58) Field of Classification Search
CPC ... G06T 7/74; G06T 7/13; G06T 2207/10016; G06T 2207/30244; G06T 2207/30252;
(Continued)

(56) References Cited

U.S. PATENT DOCUMENTS

2019/0258251 A1 8/2019 Ditty et al.

FOREIGN PATENT DOCUMENTS

CN 108764012 A 11/2018
CN 109614857 A 4/2019
(Continued)

OTHER PUBLICATIONS

Kampker, Achim, et al. "Concept study for vehicle self-localization using neural networks for detection of pole-like landmarks." International Conference on Intelligent Autonomous Systems. Cham: Springer International Publishing, 2018. (Year: 2018).*
(Continued)

*Primary Examiner* — Gregory A Morse
*Assistant Examiner* — Ronde Lee Miller
(74) *Attorney, Agent, or Firm* — Sughrue Mion, PLLC

(57) ABSTRACT

A method and apparatus for recognizing a rod-shaped object in an image including determining, based on initial rod-shaped object recognition results obtained by performing rod-shaped object detection on a plurality of frames of consecutive images, at least two frames of consecutive images in which rod-shaped objects exist in the plurality of frames of consecutive images, determining device pose data based on an image acquisition device acquiring the at least two frames of consecutive images, projecting a detection point of the previous frame of image to the reference image, recognizing the same rod-shaped object in the reference image and the previous frame of image, projecting the detection point to the reference image through epipolar line search, and performing positioning processing on rod-
(Continued)

shaped objects in the reference image based on matching points in which the epipolar line intersects with the fitting straight lines.

20 Claims, 6 Drawing Sheets

(51) Int. Cl.

| | |
|---|---|
| *G06F 16/29* | (2019.01) |
| *G06T 7/13* | (2017.01) |
| *G06V 10/40* | (2022.01) |
| *G06V 10/46* | (2022.01) |
| *G06V 10/62* | (2022.01) |
| *G06V 20/40* | (2022.01) |
| *G06V 20/56* | (2022.01) |
| *G06V 20/58* | (2022.01) |

(52) U.S. Cl.
CPC .............. *G06T 2207/10016* (2013.01); *G06T 2207/30244* (2013.01); *G06T 2207/30252* (2013.01)

(58) Field of Classification Search
CPC ...... G06V 20/58; G06V 10/462; G06V 10/62; G06V 20/56; G06V 20/40; G06V 10/40; Y02T 10/40; G06F 16/23; G06F 16/29
See application file for complete search history.

(56) References Cited

FOREIGN PATENT DOCUMENTS

| | | |
|---|---|---|
| CN | 113450387 A | 9/2021 |
| WO | 2021/232463 A1 | 11/2021 |

OTHER PUBLICATIONS

Zeng, Jiexian, et al. "Straight line matching method based on line pairs and feature points." IET Computer Vision 10.5 (2016): 459-468. (Year: 2016).*
International Search Report issued Nov. 20, 2023 in International Application No. PCT/CN2023/113024.
Zeng et al., "Straight line matching method based on line pairs and feature points", IET Computer Vision, vol. 10, Issue 5, 2016, pp. 459-468.
Extended European Search Report dated Feb. 20, 2025 in application No. 23867176.2.

* cited by examiner

Determine, based on initial rod-shaped object recognition results obtained by performing rod-shaped object detection on a plurality of frames of consecutive images, at least two frames of consecutive images in which rod-shaped objects exist in the plurality of frames of consecutive images — 201

Determine device pose data corresponding to a case that an image acquisition device acquires the at least two frames of consecutive images, and project a detection point of the previous frame of image to the reference image based on the device pose data, to obtain a detection point projection — 203

Recognize the same rod-shaped object in the reference image and the previous frame of image based on fitting straight lines of initial rod-shaped object recognition results of the reference image and the detection point projection — 205

Project the detection point to the reference image through epipolar line search, to obtain an epipolar line in the reference image — 207

Perform positioning processing on rod-shaped objects in the reference image based on matching points in which the epipolar line intersects with the fitting straight lines, to obtain recognition results of the rod-shaped objects in the reference image — 209

FIG. 2

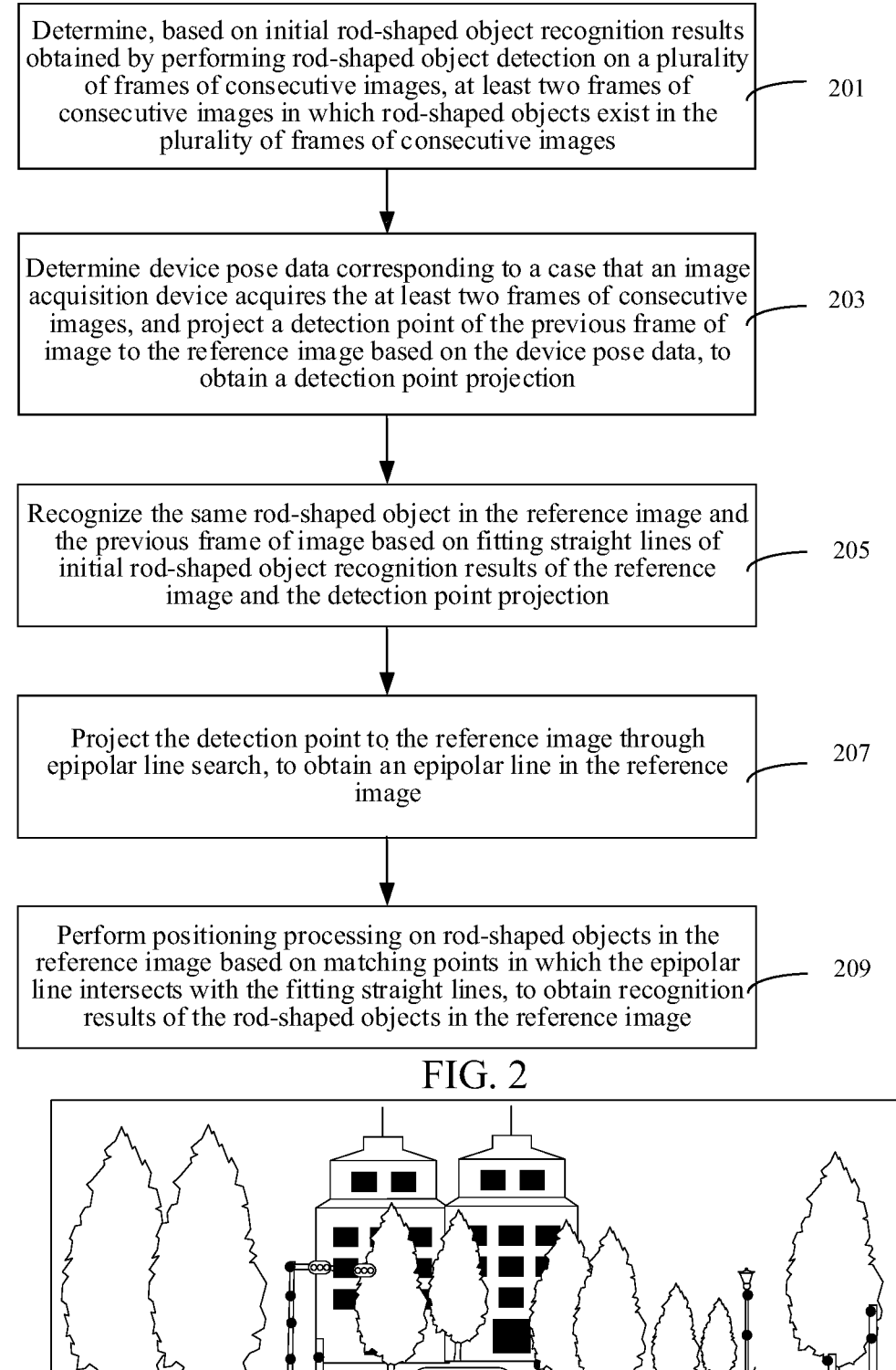

FIG. 3

High-precision map

Initial window

Sliding window

METHOD AND APPARATUS FOR RECOGNIZING ROD-SHAPED OBJECT IN IMAGE, COMPUTER DEVICE, AND STORAGE MEDIUM

CROSS-REFERENCE TO RELATED APPLICATIONS

This application is a continuation application of International Application No. PCT/CN2023/113024 filed on Aug. 15, 2023, which claims priority to Chinese Patent Application No. 202211163449.0, filed with the China National Intellectual Property Administration on Sep. 23, 2022, the disclosures of each being incorporated by reference herein in their entireties.

FIELD

The disclosure relates to the field of image processing technologies, and in particular, to a method and apparatus for recognizing a rod-shaped object in an image, a computer device, a storage medium, and a computer program product.

BACKGROUND

With the development of computer technologies and artificial intelligence technologies, the computer vision technology has emerged. The computer vision is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. Detection and positioning of targets is an application of the computer vision technology. For example, currently, detection on targets such as roadside rod-shaped objects and lane lines can be used to assist in construction of high-precision maps.

In the related art, for rod-shaped objects on the road, line segment matching can be generally performed by using computational descriptors, to achieve matching of rod-shaped objects. However, this manner is easily affected by factors such as illumination, and can only be applicable to indoor and structured objects, while outdoor rod-shaped objects have similar structures, and the illuminance changes greatly, resulting in relatively low accuracy of using computational descriptors to perform rod-shaped object matching.

SUMMARY

According to some embodiments a method and apparatus for recognizing a rod-shaped object in an image, a computer device, a computer-readable storage medium, and a computer program product are provided.

Some embodiments provide a method for recognizing a rod-shaped object in an image, performed by a computer device, the method including: determining, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images comprising a reference image and a previous frame of image of the reference image; determining device pose data based on an image acquisition device acquiring the at least two frames of consecutive images, and projecting a detection point of the previous frame of image to the reference image based on the device pose data to obtain a detection point projection, the detection point being a point in the previous frame of image that is closest to a reference plane, the reference plane existing in both the reference image and the previous frame of image; recognizing the same rod-shaped object in the reference image and the previous frame of image based on fitting straight lines of initial rod-shaped object recognition results of the reference image and the detection point projection; projecting the detection point to the reference image through epipolar line search, to obtain an epipolar line in the reference image; and performing positioning processing on rod-shaped objects in the reference image based on matching points in which the epipolar line intersects with the fitting straight lines, to obtain recognition results of the rod-shaped objects in the reference image.

Some embodiments provide an apparatus for recognizing a rod-shaped object in an image. The apparatus includes: at least one memory configured to store program code; and at least one processor configured to read the program code and operate as instructed by the program code, the program code comprising: target recognition code configured to cause at least one of the at least one processor to determine, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images comprising a reference image and a previous frame of image of the reference image; detection point projection code configured to cause at least one of the at least one processor to determine device pose data based on an image acquisition device acquiring the at least two frames of consecutive images, and project a detection point of the previous frame of image to the reference image based on the device pose data to obtain a detection point projection, the detection point being a point in the previous frame of image that is closest to a reference plane, the reference plane existing in both the reference image and the previous frame of image; rod-shaped object matching code configured to cause at least one of the at least one processor to recognize the same rod-shaped object in the reference image and the previous frame of image based on fitting straight lines of initial rod-shaped object recognition results of the reference image and the detection point projection; epipolar line search code configured to cause at least one of the at least one processor to project the detection point to the reference image through epipolar line search, to obtain an epipolar line in the reference image; and rod-shaped object recognition code configured to cause at least one of the at least one processor to perform positioning processing on rod-shaped objects in the reference image based on matching points in which the epipolar line intersects with the fitting straight lines, to obtain recognition results of the rod-shaped objects in the reference image.

Some embodiments provide a non-transitory computer-readable storage medium storing computer code which, when executed by at least one processor, causes the at least one processor to at least: determine, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images comprising a reference image and a previous frame of image of the reference image; determine device pose data based on an image acquisition device acquiring the at least two frames of consecutive images, and project a detection point of the previous frame of image to the reference image based on the device pose data, to obtain a detection point projection, the detection point being a point in the previous frame of image that is closest to a reference plane, the reference plane existing in both the reference image and the previous frame of image; recognize the same rod-shaped object in the reference image and the previous frame of image based on fitting straight lines of initial rod-shaped object recognition results of the reference image and the detection point projection; project the detection point to the reference image through epipolar line search to obtain an epipolar line in the reference image; and perform positioning processing on rod-shaped objects in the reference image based on matching points in which the epipolar line intersects with the fitting straight lines, to obtain recognition results of the rod-shaped objects in the reference image.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 2 is a schematic flowchart of a method for recognizing a rod-shaped object in an image according to some embodiments.

FIG. 3 is a schematic diagram of initial rod-shaped object recognition results according to some embodiments.

DESCRIPTION OF EMBODIMENTS

Figure 1:
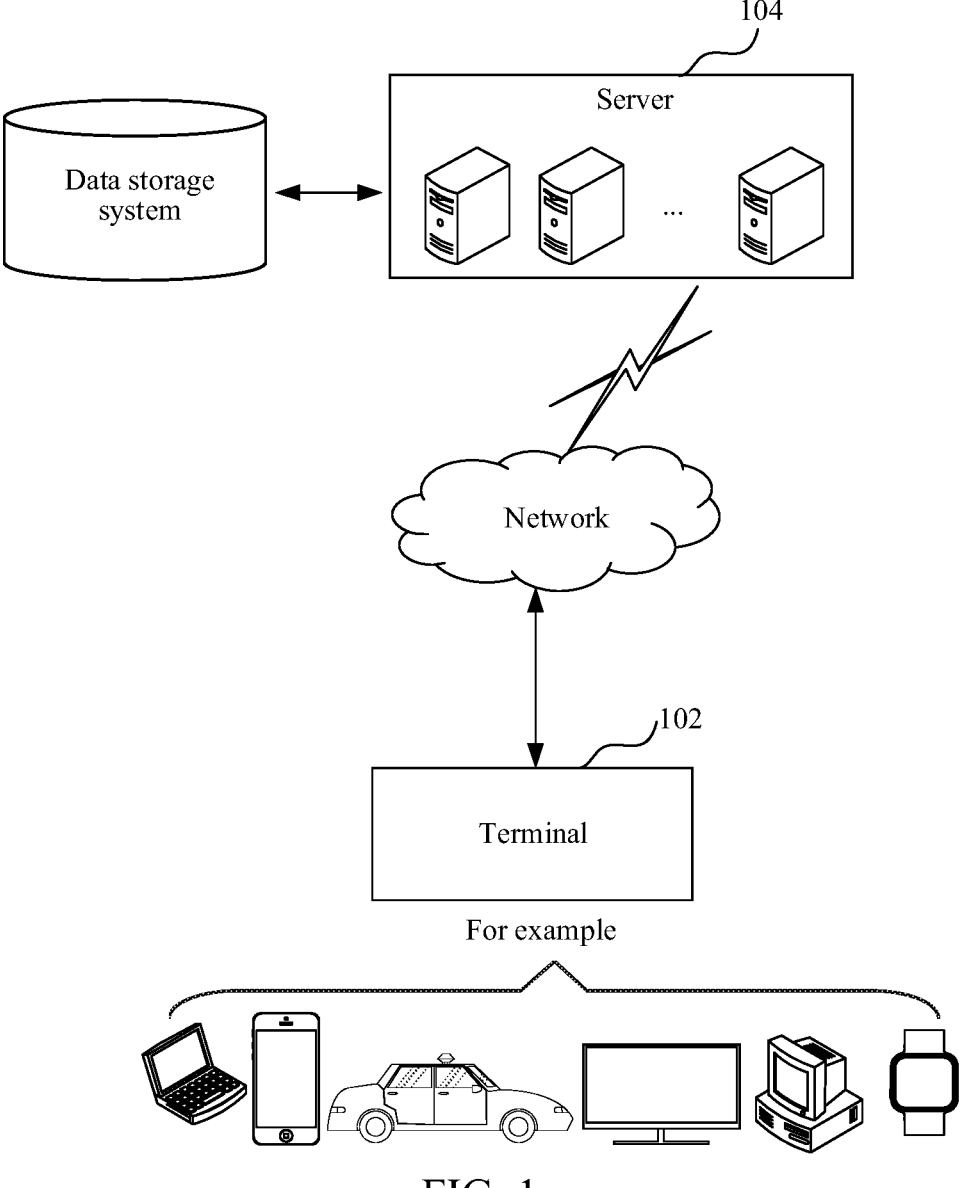
FIG. 1 is a diagram of an application environment of a method for recognizing a rod-shaped object in an image according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In this article, it is to be understood that the terms involved are as follows:

Visual inertial odometry (VIO): It is also referred to as visual-inertial system (VINS), and is an algorithm that integrates camera and inertial measurement unit (IMU) data to achieve simultaneous localization and mapping (SLAM).

Preintegration: In a case that state variables (attitude, speed, and displacement) of the IMU at a previous moment are known, a linear acceleration and an angular velocity measured by the IMU are used to perform an integral operation to obtain state variables at the current moment.

Sliding-window algorithm: Operations are performed on a character string or array of a specific size instead of an entire character string or array, which reduces the complexity of the problem, thereby reducing the loop nesting depth. In some embodiments, it refers to that rod-shaped objects are followed by moving temporally consecutive image frames, and the following is not performed in adjacent frames, which effectively avoids the influence of missed detection of a single image on vectorization, thereby ensuring more reliable rod matching.

Essential matrix: It is also referred to as E matrix, which reflects a relationship between representations of image points of a point P in the space in the camera coordinate system under different viewing angle cameras.

Fundamental matrix: It is also referred to as F matrix, and inter-frame matching of points on an image coordinate system is implemented through the F matrix. Similar to the E matrix, the F matrix is generally used for epipolar search.

Homography matrix: It is also referred to as H matrix, which describes the perspective transformation of a plane and its corresponding image in the real world; and through the perspective transformation, the image is transformed from one view to another view.

Normalization plane: The normalization plane is obtained by dividing all three-dimensional points of the camera coordinate system by Z (depth direction).

Triangulation: Triangulation is also referred to as triangulation measurement, which refers to observing included angles of feature points in a three-dimensional space from different positions to measure depth values of the points.

Bundle adjustment method: It is referred to as BA for short, in which an attitude of a camera and three-dimensional coordinates of a measurement point are used as unknown parameters, and feature point coordinates detected on the image for forward intersection are used as observation data, to perform adjustment to obtain optimal camera parameters and world point coordinates.

A method for recognizing a rod-shaped object in an image provided some embodiments may be applied to an application environment shown in FIG. 1. A terminal 102 communicates with a server 104 through a network. A data storage system may store data that needs to be processed by the server 104. The data storage system may be integrated on the server 104, or placed on the cloud or another server. After the terminal 102 acquires a plurality of frames of consecutive images, in order to perform positioning on rod-shaped objects existing in the image, the plurality of frames of consecutive images and corresponding pose data (poses of the image acquisition device for acquiring the images), position data, and the like may be transmitted to the server 104, and the server 104 implements precise positioning of the rod-shaped objects in the image. After obtaining the plurality of frames of consecutive images, the server 104 first determines, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images including a reference image and a previous frame of image of the reference image; determines device pose data corresponding to a case that an image acquisition device acquires the at least two frames of consecutive images, and project a detection point of the previous frame of image to the reference image based on the device pose data, to obtain a detection point projection, the detection point being a point in the previous frame of image that is closest to a reference plane; recognizes the same rod-shaped object in the reference image and the previous frame of image based on fitting straight lines of initial rod-shaped object recognition results of the reference image and the detection point projection, the reference plane existing in both the reference image and the previous frame of image; projects the detection point to the reference image through epipolar line search, to obtain an epipolar line; and performs positioning processing on rod-shaped objects in the reference image based on matching points in which the epipolar line intersects with the fitting straight lines, to obtain recognition results of the rod-shaped objects in the reference image. The terminal 102 may be, but not limited to, any desktop computer, notebook computer, smartphone, tablet computer, Internet of Things device, and portable wearable device. The Internet of Things device may be a smart speaker, a smart television, a smart air conditioner, a smart in-vehicle device, or the like. The portable wearable device may be a smart watch, a smart band, a head-mounted device, or the like. The server 104 may be implemented by an independent server or a server cluster including a plurality of servers.

In some embodiments, as shown in FIG. 2, a method for recognizing a rod-shaped object in an image is provided. The method may be applied to a terminal or a server. A description is provided below by using an example in which the method is applied to the server 104 in FIG. 1. The method includes the following operations:

Operation 201: Determine, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images including a reference image and a previous frame of image of the reference image.

The plurality of frames of consecutive images refer to a series of images continuously acquired by the same image acquisition device. These images are sorted according to capture times and are also detection targets. In the plurality of frames of consecutive images, the same rod-shaped object may exist in previous and next images, so that precise positioning is achieved based on the same rod-shaped object existing in previous and next images. Rod-shaped object detection refers to recognizing rod-shaped objects in images through the image recognition technology. The initial rod-shaped object recognition results refer to rod-shaped object detection results obtained through recognition by using the image recognition technology. The initial rod-shaped object recognition results are shown in FIG. 3, and are formed by a plurality of groups of detection points contained in the images. Each group of detection points contains a plurality of detection points. Detection points in the same group are on a straight line, representing one rod-shaped object. The at least two frames of consecutive images do not mean that there are rod-shaped objects in only two consecutive images of the plurality of frames of consecutive images, but that there are two or more images in which rod-shaped objects in the plurality of frames of consecutive images. However, in some embodiments, rod-shaped object positioning can be achieved with only two images. The reference image refers to an image used as a standard of rod-shaped object positioning, and rod-shaped object positioning refers to performing positioning on the rod-shaped objects existing in the reference image.

Figure 4:
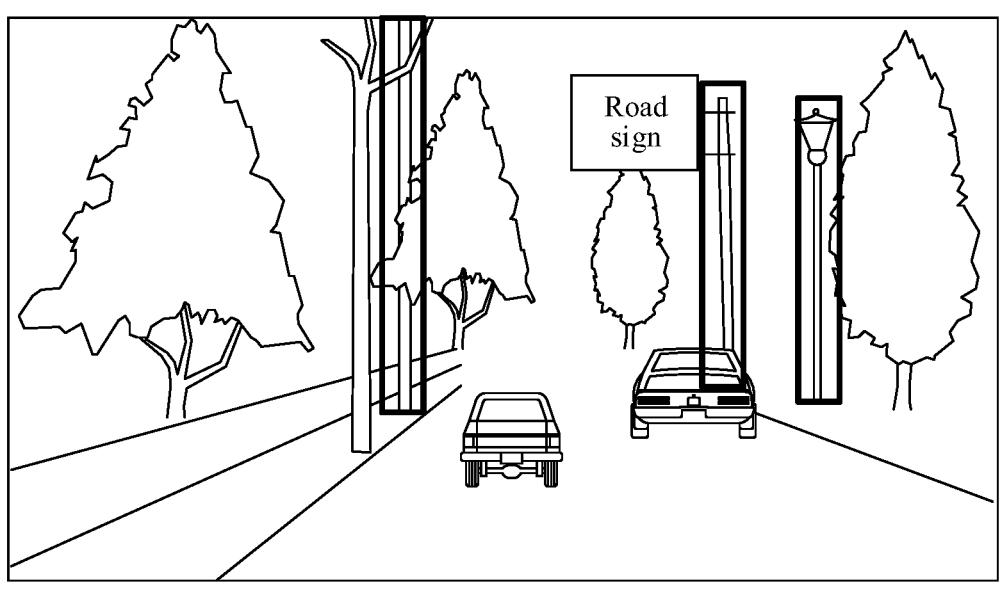
FIG. 4 is a schematic diagram of roadside rod-shaped objects according to some embodiments.
Figure 5:
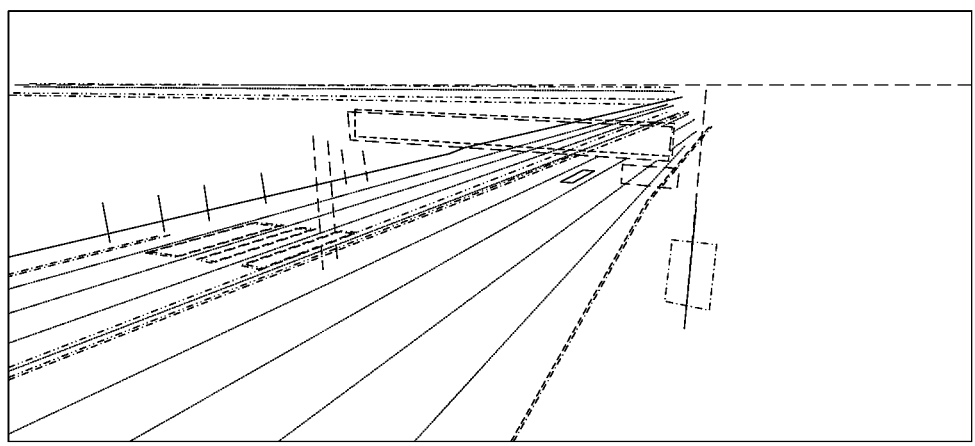
FIG. 5 is a schematic diagram of a high-precision map vectorization result according to some embodiments.
Figure 6:
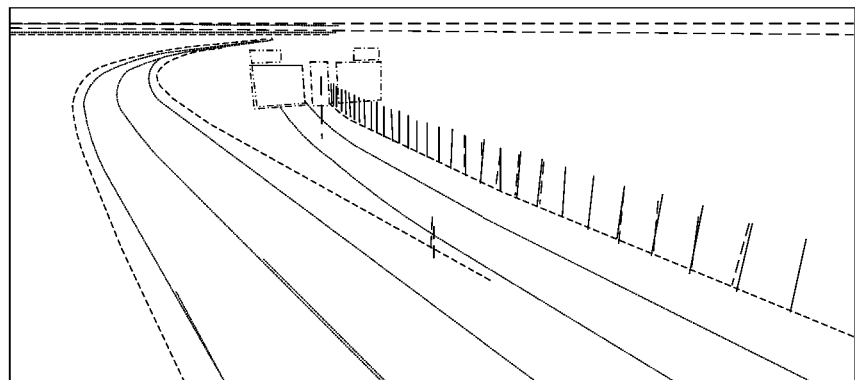
FIG. 6 is a schematic diagram of a high-precision map vectorization result according to some embodiments.

In some embodiments, specific positions of rod-shaped objects in an image are obtained by performing recognition and positioning on the rod-shaped objects in the image. When a user of the terminal 102 needs to perform positioning processing, data such as a series of acquired consecutive images, poses, and positions may be provided to the server 104, and the server 104 implements positioning processing on the rod-shaped objects in the image. After obtaining these data, the server 104 first performs rod-shaped object detection on the plurality of frames of consecutive images respectively, and determines initial rod-shaped object recognition results of each frame of these images. Therefore, specific positions of rod-shaped objects in each image are preliminarily determined. In some embodiments, the solution may be applied to drawing of a high-precision map. As shown in FIG. 4, rod-shaped objects on a road are one of the most important semantic features of the high-precision map, which can be used for semantic positioning of lane-level navigation, thereby autonomously assisting in driving in a high-level manner. However, data acquired by surveying-and-mapping-level acquisition vehicles cannot meet the needs of updating high-precision maps. Especially on an urban road, data changes are measured in weeks or even days, and detecting changes (missing and adding) in rod-shaped objects on the road in a timely manner is crucial to the freshness of the high-precision map. Therefore, some embodiments can be used to perform rod-shaped object recognition processing on a plurality of frames of consecutive images captured by an in-vehicle camera, so that the high-precision map is updated at any time based on recognition results of rod-shaped objects. As shown in the high-precision map vectorization results shown in FIG. 5 and FIG. 6, different types of rod-shaped objects are distributed on two sides of the road. These rod-shaped objects can help vehicles to perform high-level assisted driving. The basis of high-precision maps is generally carried out through high-precision acquisition vehicles, which generally requires professional devices and acquisition personnel to operate. The vehicles are few, and the costs are high, so that the update is slow. In some embodiments, the crowdsourcing update of rod-shaped objects in a high-precision map can be realized, and ordinary on-board units or mobile phones can complete the data difference, thereby ensuring the freshness of high-precision data. Therefore, after an in-vehicle terminal submits a plurality of frames of consecutive images, the server 104 may perform rod-shaped object detection on the plurality of frames of consecutive images, to obtain initial rod-shaped object recognition results. Subsequently, further high-precision rod-shaped object positioning and recognition is performed based on the initial rod-shaped object recognition results. Because positioning needs to be performed on rod-shaped objects in the image, the positioning can be performed only when there are rod-shaped objects in the image. After rod-shaped object detection is performed on the plurality of frames of consecutive images to obtain the initial rod-shaped object recognition results, several images containing rod-shaped objects first need to be selected therein, and then these images are used to achieve rod-shaped object positioning. One of the images may be selected as a reference image in an order corresponding to the images (the first frame of image cannot be selected), and a previous frame of image of the reference image is obtained to assist in rod-shaped object recognition. In some embodiments, the methods may be applied to the drawing of a high-precision map. In some embodiments, the plurality of frames of consecutive images may be a series of images captured by an in-vehicle camera. It is assumed that there is only one rod-shaped object within 20 meters, and the vehicle speed is generally 10 m/s to 30 m/s. A frame rate of the in-vehicle camera is generally 5 Hz to 10 Hz, so that five to ten images may be selected as a group of a plurality of frames of consecutive images. If the capturing is normal, these images all contain the same rod-shaped object. Therefore, these images may all be used as the at least two frames of consecutive images for rod-shaped object recognition. For example, an image with the latest capture time point is selected as a reference image, and an image with the second latest capture time point is selected as a previous frame of image of the reference image.

Operation 203: Determine device pose data corresponding to a case that an image acquisition device acquires the at least two frames of consecutive images, and project a detection point of the previous frame of image to the reference image based on the device pose data, to obtain a detection point projection, the detection point being a point in the previous frame of image that is closest to a reference plane, the reference plane existing in both the reference image and the previous frame of image.

Projection refers to projecting a shadow of a figure onto a plane or a line. In some embodiments, projection refers to projecting the detection point corresponding to at least one rod-shaped object existing in the previous frame of image to the reference image, to obtain a position of the detection point in the reference image, that is, a detection point projection.

In some embodiments, because same rod-shaped objects exist in two consecutive frames of images, in order to match these same rod-shaped objects, the detection point closest to the reference plane in the rod-shaped object recognition results of the previous frame of image may be first projected to the reference image through the projection technology. In a specific embodiment, because the capture device may move in the image capture process, the projection may be performed based on device pose data corresponding to the reference image and the previous frame of image. During specific projection, a homography matrix may be constructed based on the reference image and the previous frame of image of the reference image, and then the projection is implemented through the homography matrix.

Operation 205: Recognize the same rod-shaped object in the reference image and the previous frame of image based on fitting straight lines of initial rod-shaped object recognition results of the reference image and the detection point projection.

The reference plane refers to a plane that serves as a comparison plane in the two images. Generally, the ground may be selected as the reference plane. Because the ground has not changed relative to rod-shaped objects in the two previous and next images, the ground can be used as a comparison. The fitting straight lines refer to a plurality of groups of straight lines determined based on the initial rod-shaped object recognition results, because the initial rod-shaped object recognition results contain a plurality of groups of detection points, and each group of detection points is on the same straight line. Therefore, straight line fitting can be performed for each group of detection points, to obtain a straight line. In this process, if the quantity of detection points in a certain group in the initial rod-shaped object recognition results is less than 3, the group may be omitted directly, thereby avoiding the influence of no detection and external points. The same rod-shaped object refers to the same rod-shaped object that exists in the reference image and the previous frame of image, but due to different capture timings, the same rod-shaped object respectively exists in both of the two previous and next images.

In some embodiments, after the detection point closest to the reference plane in the rod-shaped object recognition results of the previous frame of image is projected to the reference image, the projection of the detection point and a fitting straight line of an initial rod-shaped object recognition result may be used to determine an approximate distance between a rod-shaped object corresponding to the detection point in the previous frame of image and a rod-shaped object corresponding to the fitting straight line, thereby determining whether the two rod-shaped objects are the same rod-shaped object. In some embodiments, due to a relatively short interval between the capture timings of the previous and next images in the plurality of frames of consecutive images, the same rod-shaped object may exist, and a solution is to perform positioning recognition by recognizing the same rod-shaped object. Therefore, after the projection is completed, a straight-line distance between the projection of the detection point and a fitting straight line of an initial rod-shaped object recognition result is determined first, and then whether the rod-shaped objects corresponding to the projection of the detection point and the initial rod-shaped object recognition result are the same rod-shaped object is determined. It the two rod-shaped objects are the same rod-shaped object, subsequent rod-shaped object recognition can be performed.

Operation 207: Project the detection point to the reference image through epipolar line search, to obtain an epipolar line in the reference image.

The epipolar line search refers to determining an epipolar line in the reference image. The epipolar line is a concept in epipolar geometry, which refers to an intersection line between an epipolar plane and an image. Epipolar geometry describes an internal projective relationship between two views, which is irrelevant with the external scenario and only depends on internal parameters of the image acquisition device and relative attitudes between the two views.

In some embodiments, after the reference image and the previous frame of image are determined, the two images are used as two views of the epipolar geometry, thereby performing epipolar line search to determine the epipolar line in the reference image. The projection herein is different from the projection process in operation 203. In operation 203, it is only an approximate projection. Herein, the projection is performed in an epipolar line search manner, and the epipolar line in the reference image can be accurately found based on the determined same rod-shaped object. When it is known that relative poses between the two frames of images are R and t, a formula for epipolar line search is:

$$l = K^{-T} t_x R K^{-1} x$$

where K, $t_x$, and R respectively represent an internal parameter of the camera, an antisymmetric matrix of a translation vector, and a rotation matrix.

Operation 209: Perform positioning processing on rod-shaped objects in the reference image based on matching points in which the epipolar line intersects with the fitting straight lines, to obtain recognition results of the rod-shaped objects in the reference image.

The matching point refers to an intersection point between the epipolar line in the two-dimensional reference image and the fitting straight line. Positioning processing refers to the process of determining a specific position of a rod-shaped object corresponding to the matching point in a world coordinate system. This determined specific position is a recognition result of a rod-shaped object in the reference image.

In some embodiments, by converting the two-dimensional matching points for triangulation, the position of the rod-shaped object corresponding to the matching point in the reference image in the camera coordinate system can be obtained through positioning. Subsequently, through coordinate system conversion, the position in the camera coordinate system can be converted into a position in the world coordinate system, and the precise position of the rod-shaped object in the world coordinate system can be determined, thereby completing the positioning, and obtaining the recognition result of the rod-shaped object in the reference image. In some embodiments, the solution herein may be applied to the drawing of a high-precision map. In some embodiments, rod-shaped object positions in the high-precision map can be updated based on determined rod-shaped object positions, and the rod-shaped objects can be used as anchor points of roads for absolutely precise positioning of lane lines. In some embodiments, the solution herein is applicable to visual matching of lane-level navigation. In some embodiments, a determined rod-shaped object position is matched with high-precision parent library data to determine an absolute position of the vehicle in the world coordinate system. In addition, the solution herein may also be applied to high-level assisted driving, and the absolute position of the vehicle in the world coordinate system can also be determined through visual matching.

In the foregoing method for recognizing a rod-shaped object in an image, based on initial rod-shaped object recognition results obtained by performing rod-shaped object detection on a plurality of frames of consecutive images, at least two frames of consecutive images in which rod-shaped objects exist in the plurality of frames of consecutive images are determined, so that two frames of images that need to be processed are determined. Device pose data corresponding to a case that an image acquisition device acquires the at least two frames of consecutive images is determined, and a detection point of the previous frame of image is projected to the reference image based on the device pose data, to obtain a detection point projection; the same rod-shaped object in the reference image and the previous frame of image is recognized based on fitting straight lines of initial rod-shaped object recognition results of the reference image and the detection point projection, to obtain a matching result of the reference image and the previous frame of image; then the detection point is projected to the reference image through epipolar line search, to obtain an epipolar line in the reference image, thereby reducing projection errors through the epipolar line; and then positioning processing is performed on rod-shaped objects in the reference image based on matching points in which the epipolar line intersects with the fitting straight lines, to determine precise positions of the rod-shaped objects in the reference image, and obtain recognition results of the rod-shaped objects in the reference image. This application can improve the accuracy of positioning of rod-shaped objects in images.

In some embodiments, before operation 201, the method further includes: performing rod-shaped object recognition processing on the plurality of frames of consecutive images, to obtain a plurality of groups of detection points; and determining each rod-shaped object in the plurality of frames of consecutive images according to the plurality of groups of detection points, to obtain the initial rod-shaped object recognition results of the plurality of frames of consecutive images.

Some embodiments can realize rod-shaped object recognition processing on a plurality of frames of consecutive images through an object detection network. The object detection network refers to a network mechanism similar to LaneNet. LaneNet is currently generally used to detect lane lines, and can extract positions of lane lines in a road image based on the captured road image. In some embodiments, rod-shaped object detection is realized through an object detection network, and relatively vertical rod-shaped objects existing in images can be detected. The detection point refers to a point on a detected rod-shaped object, and each group of detection points corresponds to one detected rod-shaped object.

In some embodiments, the preliminary rod-shaped object detection may be realized through an object detection network similar to LaneNet. An initial object detection network may be trained by using rod-shaped objects as detection targets, then all of the plurality of frames of consecutive images are respectively inputted into the trained object detection network, and detection and annotation of rod-shaped objects in an image are realized through the object detection network. Annotation refers to annotating the rod-shaped objects existing in the image through detection points. Each rod-shaped object corresponds to a group of detection points connected in a line, and initial rod-shaped object recognition results are finally obtained based on the detection results. In some embodiments, after the initial rod-shaped object recognition results are obtained, the initial rod-shaped object recognition results may be screened again to remove rod-shaped objects with less than 3 detection points, thereby avoiding influence of no detection and external points on rod-shaped object recognition. In some embodiments, the solution herein may be applied to the drawing of a high-precision map. In some embodiments, rod-shaped objects that need to be recognized may include signs, street lights, traffic lights, and the like beside the road.

Annotation images containing contents such as signs, street lights, and traffic lights may be used as training data to train the object detection network, thereby realizing the recognition processing of rod-shaped objects in the road. In this embodiment, through initial recognition of rod-shaped objects, the accuracy of rod-shaped object recognition can be effectively ensured.

In some embodiments, operation 203 includes: obtaining device pose data corresponding to each frame of image corresponding to the case that the image acquisition device acquires the at least two frames of consecutive images; constructing a homography matrix based on the device pose data corresponding to each frame of image; and projecting the detection point to the reference image through the homography matrix, to obtain the detection point projection.

Pose data refers to a position and an attitude. To describe the attitude, a coordinate system is attached to an object, and then a description of this coordinate system relative to a reference system is given, that is, the direction is described through a rotation matrix. The device pose data of the at least two frames of consecutive images refers to positions and attitudes of the image acquisition device when acquiring the two images. Homography matrix: It is also referred to as H matrix, which describes the perspective transformation of a plane and its corresponding image in the real world; and through the perspective transformation, the image is transformed from one view to another view. In some embodiments, refers to transforming a detection point from a view of the previous frame of image to a view of the reference image. The reference plane refers to an objective plane that exists in both the at least two frames of consecutive images and can exist as a plane of reference. In a specific embodiment, the ground may generally be selected as the reference plane.

In some embodiments, a rod-shaped object reference point in the previous frame of image may be projected onto the reference image through the homography matrix. Therefore, before projection is required, the device pose data of the image acquisition device corresponding to the two frame of images may be used to construct a homography matrix first. In some embodiments, in the projection process, the homography matrix is used to project the detection point closest to the reference plane in the rod-shaped object recognition results of the previous frame of image to an image normalization plane, and then coordinates on the image normalization plane are converted into coordinates on the reference image with reference to the internal parameters of the image acquisition device. The image normalization plane is a plane obtained by dividing all three-dimensional points of an image acquisition device coordinate system by Z (a value in the depth direction). In this embodiment, the homography matrix is constructed based on device pose data, and detection points representing the rod-shaped object recognition results of the previous frame of image can be accurately projected to the reference image, thereby ensuring the accuracy of rod-shaped object recognition.

In some embodiments, the obtaining device pose data corresponding to each frame of image corresponding to the case that the image acquisition device acquires the at least two frames of consecutive images includes: obtaining speed data of the image acquisition device in a case of acquiring the plurality of frames of consecutive images and initial pose data of the image acquisition device; and performing preintegration processing on the speed data based on the initial pose data, to obtain the device pose data corresponding to each of the at least two frames of consecutive images.

The speed data includes data such as acceleration measurement values, angular velocity measurement values, acceleration offsets, and angular velocity offsets of the image acquisition device corresponding to the at least two frames of consecutive images, and may also include data such as speed measurement values and speed offsets. For the speed data acquisition process, for devices without wheel speeds, for example, image acquisition devices such as smartphones, speeds are obtained through acceleration integration; and for devices with wheel speeds, such as in-vehicle cameras, speeds may be measured directly. Preintegration: In a case that state variables (attitude, speed, and displacement) of the IMU at a previous moment are known, a linear acceleration and an angular velocity measured by the IMU are used to perform an integral operation to obtain state variables at the current moment.

In some embodiments, because construction of the homography matrix requires combining the device pose data of at least two frames of consecutive images, the device pose data respectively corresponding to the two frames of images first needs to be estimated. Therefore, the speed data and initial pose data of the image acquisition device when acquiring the plurality of frames of consecutive images may be first obtained, and then preintegration calculation is performed based on the initial pose data and the speed data corresponding to each of the plurality of frames of consecutive images. Device pose data corresponding to the first frame of image is determined from the initial pose data, and then device pose data corresponding to the second frame of image is determined based on the device pose data corresponding to the first frame of image. Calculation is performed based on this, until the device pose data of each frame of image is determined, and then the device pose data corresponding to each of the at least two frames of consecutive images is determined therein. In this embodiment, the preintegration calculation is performed based on the initial pose data of the image acquisition device and the speed data corresponding to each frame of image, so that the device pose data corresponding to each of the at least two frames of consecutive images can be effectively determined, thereby accurately establish the homography matrix, to ensure the accuracy of rod-shaped object recognition.

In some embodiments, the speed data includes an acceleration measurement value, an angular velocity measurement value, an acceleration offset, and an angular velocity offset, and the pose data includes position data, speed data, and angle data; and the performing preintegration processing on the speed data based on the initial pose data, to obtain the device pose data corresponding to each of the at least two frames of consecutive images includes: determining position data and speed data corresponding to each of the at least two frames of consecutive images based on the initial pose data, the acceleration measurement value, and the acceleration offset; and determining angle data corresponding to each of the at least two frames of consecutive images based on the initial pose data, the angular velocity measurement value, and the angular velocity offset.

In some embodiments, the pose data includes data in three directions: position data, speed data, and angle data. Therefore, during calculation, these three pieces of data need to be calculated separately, and the final device pose data is obtained by combining the three pieces of data. Both the position data and the speed data may be determined based on the acceleration measurement value and acceleration offset. The angle data is determined based on the angular velocity measurement value and the angular velocity offset. For the position data, the specific calculation formula thereof is:

$$p \leftarrow p + v\Delta t + \frac{1}{2}(R(a_m - a_b) + g)\Delta t^2$$

For the speed data, the specific calculation formula thereof is:

$$v \leftarrow v + (R(a_m - a_b) + g)\Delta t$$

where p and v before the arrow respectively represent the position data and the speed data in the pose data of the previous frame of image, and p and v after the arrow represent the position data and the speed data of the current frame of image. $a_m$ and $a_b$ respectively represent acceleration measurement value data and the acceleration offset. R represents a rotation matrix between adjacent frames of images, and g is a gravity acceleration. $\Delta t$ represents a motion time between two frames. For the angle data, the specific calculation formula thereof is:

$$q \leftarrow q \otimes (R(w_m - w_b)\Delta t$$

where q before the arrow represents the angle data in the pose data of the previous frame of image, and q after the arrow represents the angle data of the current frame of image; and $w_m$ and $w_b$ respectively represent angular velocity measurement value data and the angular velocity offset. In this embodiment, by determining the acceleration-related data, the position data and the speed data corresponding to each of the at least two frames of consecutive images can be effectively calculated. In addition, based on the angular velocity-related data, the angle data corresponding to each of the at least two frames of consecutive images can be effectively calculated, thereby obtaining the device pose data corresponding to each frame of image.

In some embodiments, the constructing a homography matrix based on the device pose data corresponding to each frame of image includes: determining rotation data and displacement data of the reference image and the previous frame of image relative to the reference plane based on the device pose data corresponding to each frame of image; and constructing the homography matrix based on the rotation data and the displacement data.

The rotation data and the displacement data are data used to construct the homography matrix. These two pieces of data may be determined by comparing pose changes between the two previous and next frames. The rotation data represents a change in a rotation angle of the image acquisition device relative to the reference plane between the two previous and next frames, and the displacement data represents a change in a position of the image acquisition device relative to the reference plane between the two previous and next frames.

Figure 7:
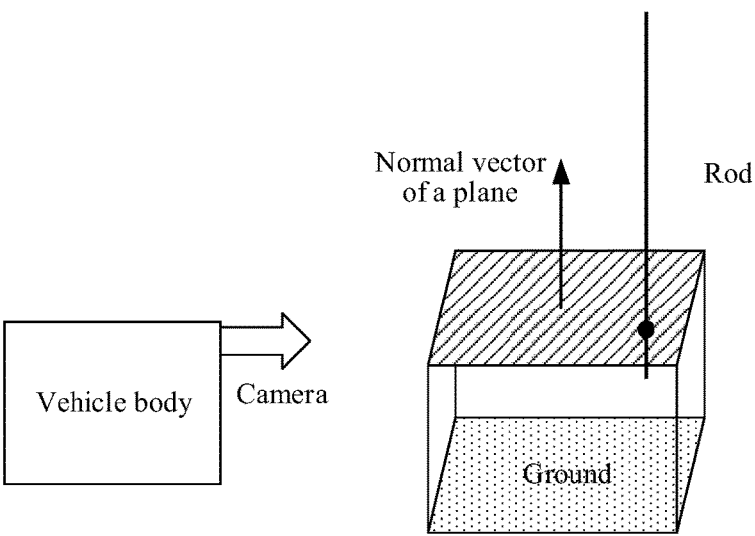
FIG. 7 is a schematic diagram of a projection process of a homography matrix according to some embodiments.

In some embodiments, after the device pose data respectively corresponding to the reference image and the previous frame of image is obtained, a homography matrix may be constructed based on the pose changes between the two images. In some embodiments, the rotation data and the displacement data of the reference image and the previous frame of image relative to the reference plane may be first determined based on the device pose data of the at least two frames of consecutive images. Subsequently, the homography matrix is constructed based on the rotation data and displacement data. Some embodiments may be applied to the drawing of a high-precision map. In some embodiments, the consecutive images may be images acquired by an in-vehicle camera. For the projection process of the homography matrix, reference may be made to FIG. 7, in which the plane on the lower right side of the figure represents the ground, the line segment passing through the plane above the ground represents a rod-shaped object, and the quadrilateral above the ground represents a second plane parallel to the ground and passing through the lowest point for rod detection, and the arrow represents a normal vector of the ground. The vehicle body and the camera are on the left side. The direction in which the vehicle body moving forward basically coincides with the imaging plane of the camera (the vehicle body for the camera has a mounting angle). For the ground plane, rotation and translation between two frames are known, and a homography matrix can be constructed, where the formula is as follows:

$$H = R + \frac{tn^T}{d}$$

where R represents the rotation matrix between the two frames, R represents the translation between the two frames, n represents a normal vector of the plane, which is approximately $n=[0,1,0]^T$ in the image coordinate system, and d represents a distance from the camera optical center to the plane. Therefore, points on the normalization plane of adjacent frames meet the following relationship:

$$s\begin{bmatrix} u_2 \\ v_2 \\ 1 \end{bmatrix} = H\begin{bmatrix} u_1 \\ v_1 \\ 1 \end{bmatrix} = R + \frac{tn^T}{d}\begin{bmatrix} u_1 \\ v_1 \\ 1 \end{bmatrix}$$

For points passing through the second plane, the following homography matrix may also be constructed:

$$H = R + \frac{tn^T}{\lambda d}$$

where $\lambda$ is a proportion coefficient, and the value range meets: $0<\lambda<1$. Points on the ground meet: $\lambda=1$, then the points on the normalization plane between adjacent frames meet the following relationship:

$$s\begin{bmatrix} u_2' \\ v_2' \\ 1 \end{bmatrix} = R + \frac{tn^T}{\lambda d}\begin{bmatrix} u_1 \\ v_1 \\ 1 \end{bmatrix} = (R + \frac{tn^T}{d})\begin{bmatrix} u_1 \\ v_1 \\ 1 \end{bmatrix} + (\frac{1}{\lambda} - 1)\frac{tn^T}{d}\begin{bmatrix} u_1 \\ v_1 \\ 1 \end{bmatrix} =$$

$$s\begin{bmatrix} u_2 \\ v_2 \\ 1 \end{bmatrix} + (\frac{1}{\lambda} - 1)\frac{tn^T}{d}\begin{bmatrix} u_1 \\ v_1 \\ 1 \end{bmatrix} = s\begin{bmatrix} u_2 \\ v_2 \\ 1 \end{bmatrix} + \lambda'\begin{bmatrix} 0 & t_x & 0 \\ 0 & t_y & 0 \\ 0 & t_z & 0 \end{bmatrix}\begin{bmatrix} u_1 \\ v_1 \\ 1 \end{bmatrix} = s\begin{bmatrix} u_2 \\ v_2 \\ 1 \end{bmatrix} + \lambda'\begin{bmatrix} v_1 t_x \\ v_1 t_y \\ v_1 t_z \end{bmatrix}$$

$$\text{where } \lambda' = (\frac{1}{\lambda} - 1)\frac{1}{d},$$

and s is a proportion coefficient, so that the foregoing formula may be written as:

$$s\begin{bmatrix} u'_2 \\ v'_2 \\ 1 \end{bmatrix} - s\begin{bmatrix} u_2 \\ v_2 \\ 1 \end{bmatrix} = \lambda'\begin{bmatrix} v_1 t_x \\ v_1 t_y \\ v_1 t_z \end{bmatrix}$$

By simultaneously dividing the first two rows of the matrix by the third row, the following can be obtained:

$$u'_2 = u_2 + \lambda'\frac{t_x}{t_z}$$

$$v'_2 = v_2 + \lambda'\frac{t_y}{t_z}$$

where $u_2$ and $v_2$ are theoretical values of the homography matrix formed by the ground projected to image normalization plane coordinates, and $$u'_2 \text{ and } v'_2$$

are theoretical values of intersection points of rods projected to image normalization plane coordinates of the current frame. For an automobile, except for changing lanes and going uphill, movements in the straight driving direction are all much larger than movements in the up-down direction and the left-right direction, so that $t_z \gg t_x$ and $t_z \gg t_y$ are met. Therefore, during straight driving, $$u'_2 = u_2 \text{ and } v'_2 = v_2$$

can be obtained. When the automobile changes lanes or climbs hills, movements in the straight driving direction are generally also larger than movements in the up-down direction or the left-right direction, where $$u'_2 \approx u_2, \text{ and } v'_2 \approx v_2.$$

Figure 8:
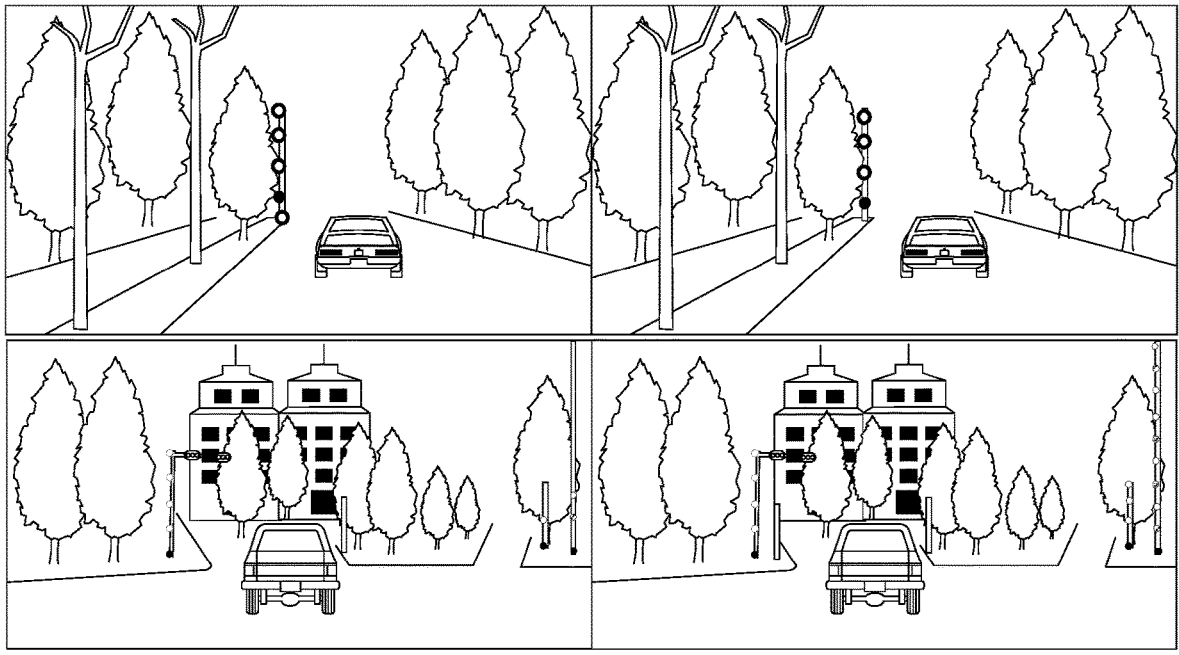
FIG. 8 is a schematic diagram of detection point projection results of a straight driving process and a turning process according to some embodiments.

Therefore, the detection point on the previous frame of image can be projected to image normalization plane coordinates. After the image normalization plane coordinates are obtained, the position corresponding to the detection point can be projected to the reference image with reference to the internal parameters of the camera. In FIG. 8, the left of the upper image represents the reference image, the right of the upper image represents the previous frame of image, the vehicle is basically in a straight driving state, and the detection point on the left is a result of projection of the detection point on the right by using the homography matrix. The left of the lower image represents the reference image, the right of the lower image represents the previous frame of image, the vehicle is basically in a turning state, and the detection point on the left is a result of projection of the detection point on the right by using the homography matrix. In this embodiment, the homography matrix is constructed based on changes in pose data, which can effectively ensure the accuracy of the homography matrix construction, thereby ensuring the accuracy of rod-shaped object recognition and positioning.

In some embodiments, before the recognizing the same rod-shaped object in the reference image and the previous frame of image based on fitting straight lines of initial rod-shaped object recognition results of the reference image and the projection of the detection point in the rod-shaped object recognition results of the previous frame of image that is closest to the reference plane in the reference image, the method further includes: performing straight line fitting on the initial rod-shaped object recognition results of the reference image by using a first-order function, to obtain the fitting straight lines corresponding to the initial rod-shaped object recognition results.

In some embodiments, straight line fitting may be achieved through a first-order function x=ky+b. By substituting coordinates of detection points in the initial rod-shaped object recognition results into the foregoing first-order function, a first-order function corresponding to the rod-shaped objects can be determined, and the straight line fitting processing process can be realized. Through straight line fitting, straight line equations corresponding to the initial rod-shaped object recognition results can be effectively determined, to determine distances between the coordinates of the projection of the detection point and the straight line equations corresponding to the initial rod-shaped object recognition results, thereby ensuring the accuracy of rod-shaped object matching.

In some embodiments, operation 205 includes: determining distance data between the fitting straight lines of the initial rod-shaped object recognition results of the reference image and the projection of the detection point on the reference image; and screening the distance data by using a preset distance threshold, to obtain a matching group formed by a fitting straight line with a distance less than the preset distance threshold and the detection point projection, and determining that an initial rod-shaped object recognition result corresponding to the fitting straight line in the matching group and an initial rod-shaped object recognition result corresponding to the detection point is the same rod-shaped object.

Determining distance data between the projection of the detection point and the fitting straight lines means that for each detection point, distances between the detection point and fitting straight lines corresponding to all rod-shaped objects in the reference image are calculated. The preset distance threshold is a screening standard for screening matching rod-shaped objects, which may be set according to the speed of the image acquisition device and the capture interval between the previous frame of image and the reference image. For the matching group, each matching group includes one detection point and one fitting straight line. If there are a plurality of fitting straight lines with distances less than the preset distance threshold for one detection point, the fitting straight line with the shortest distance may be selected to form a matching group.

Figure 9:
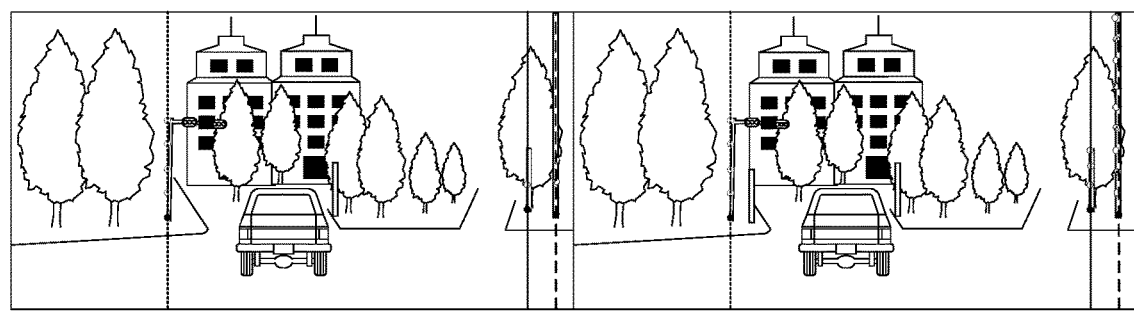
FIG. 9 is a schematic diagram of a rod-shaped object projection result according to some embodiments.

In some embodiments, the matching relationship between the detection point and a rod-shaped object on the reference image can be determined based on that the distance from the point to the straight line is less than the preset distance threshold, that is, the matching relationship between the rod-shaped object in the previous frame of image and the rod-shaped object in the reference image can be determined. Therefore, the distance data between the projection of the detection point and the fitting straight lines is first calculated. After the detection point is projected to the reference image, a coordinate corresponding to the detection point in the reference image may be determined, then distances between the coordinate and the fitting straight lines may be calculated through analytical geometry, then the distance data is screened with reference to the preset distance threshold, and a matching group formed by a fitting straight line with a distance less than the preset distance threshold and the projection of the detection point may be obtained. The data forming the matching group includes a projection of a detection point and a fitting straight line, but the two respectively represent a rod-shaped object on the previous frame of image and a rod-shaped object on the reference image in essence. Therefore, an initial rod-shaped object recognition result corresponding to the fitting straight line in the matching group and an initial rod-shaped object recognition result corresponding to the detection point being the same rod-shaped object in the reference image and the previous frame of image can be determined based on the matching group, to obtain a final result of rod-shaped object matching. As shown in FIG. 9, the left image represents the reference image, the right image represents the previous frame of image, and the points on the left represent results obtained by using the homography matrix to project the rod-shaped objects in the right image. In this embodiment, the same rod-shaped object in the two images is screened based on the distance between the projection and the fitting straight lines, thereby effectively ensuring the accuracy of rod-shaped object recognition between the two frames of images.

In some embodiments, based on the matching points in which the epipolar line intersects with the fitting straight lines, operation 207 includes: determining the matching points in which the epipolar line intersects with the fitting straight lines; performing triangulation processing on the matching points, to obtain image acquisition device coordinate system positions of the matching points; and transferring the image acquisition device coordinate system positions of the matching points to a world coordinate system, to obtain the recognition results of the rod-shaped objects in the reference image.

The matching point refers to a point in which the epipolar line intersects with the fitting straight line. Triangulation is also referred to as triangulation measurement, which refers to observing included angles of feature points in a three-dimensional space from different positions to measure depth values of the points. The image acquisition device coordinate system is a three-dimensional rectangular coordinate system established with the focus center of the image acquisition device as the origin and the optical axis as the Z-axis. The world coordinate system refers to further selecting a reference coordinate system in the environment to describe positions of the image acquisition device and objects. This coordinate system is referred to as a world coordinate system. The relationship between the image acquisition device coordinate system and the world coordinate system may be described by a rotation matrix R and a translation vector t.

Figure 10:
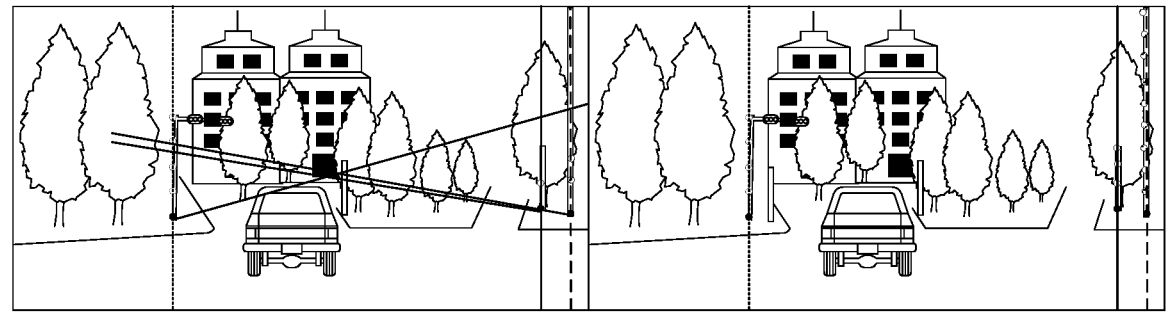
FIG. 10 is a schematic diagram of an epipolar line search result according to some embodiments.

In some embodiments, the feature point in this application refers to a recognized matching point. By triangulating the matching point, a depth value corresponding to the matching point can be determined, then the depth value of the point is combined with its coordinates on the reference image, to obtain an image acquisition device coordinate system position of the matching point. After the image acquisition device coordinate system position is obtained, the position can be converted into the world coordinate system. The position of the rod-shaped object in the reference image is accurately described through the coordinates in the world coordinate system. In some embodiments, the solution may be applied to the drawing of a high-precision map. In some embodiments, the image acquisition device may be a camera device on a vehicle body. In some embodiments, a position of a matching point in the camera coordinate system may be determined first, and then be sequentially transformed to a vehicle body coordinate system and the world coordinate system according to coordinate transformation, to obtain the position of the rod-shaped object in the world coordinate system. After the position of the rod-shaped object in the world coordinate system is obtained, the position may be compared with the parent library data to determine whether there is a newly added rod-shaped object. If there is a newly added rod-shaped object, the difference is completed. If there is no newly added rod-shaped object, it indicates that the data in the parent library is not timely, and needs to be updated, to achieve drawing and update operations on the high-precision map. As shown in FIG. 10, the left image represents the reference image, the right image represents the previous frame of image of the reference image, the line in the left image is obtained through epipolar line search by using the line in the right image, and the intersection point with the fitting line is a matching point of the two frames of images on the left and the right. In this embodiment, coordinate system transformation of the matching points can be effectively realized through triangulation processing, thereby effectively recognizing accurate positions of rod-shaped objects in the world coordinate system, and ensuring the accuracy of rod-shaped object recognition and positioning.

In some embodiments, the method further includes: searching for positioning data corresponding to a case that the image acquisition device acquires the plurality of frames of consecutive images; determining image capture positions based on the positioning data; searching for a high-precision map of the image capture positions; determining a newly added rod-shaped object based on the high-precision map and the recognition results of the rod-shaped objects in the reference image; and updating the newly added rod-shaped object to the high-precision map.

Figure 11:
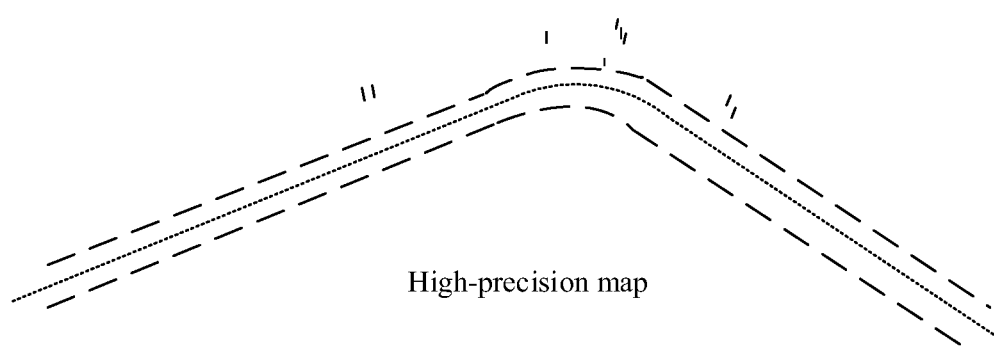
FIG. 11 is a schematic diagram of a high-precision mapping result according to some embodiments.

In some embodiments, the solution may also be applied to a crowdsourcing update task of a high-precision map. Rod-shaped objects in a road are one of the most important semantic features of the high-precision map, which can be used for semantic positioning of lane-level navigation, thereby autonomously assisting in driving in a high-level manner. However, data acquired by surveying-and-mapping-level acquisition vehicles cannot meet the needs of updating high-precision maps. Especially on an urban road, data changes are measured in weeks or even days, and detecting changes (missing and adding) in rod-shaped objects on the road in a timely manner is crucial to the freshness of the high-precision map. Therefore, the solution of some embodiments can be used to perform rod-shaped object recognition processing on a plurality of frames of consecutive images captured by an in-vehicle camera, so that the high-precision map is updated at any time based on recognition results of rod-shaped objects. In the update process, positioning data corresponding to a case that the image acquisition device acquires the plurality of frames of consecutive images may be first searched for. The specific position corresponding to the image is determined, that is, the image capture position is determined based on the positioning data. After the position is determined, a currently existing high-precision map for the image capture position is searched for. Finally, a newly added rod-shaped object is determined based on the high-precision map and the recognition results of the rod-shaped objects in the reference image, thereby updating the high-precision map. FIG. 11 shows a display effect of high-precision mapping when the solution is applied to a high-precision mapping task. The small thin lines outside the road are results of rod vectorization, which may be used for data difference or high-level assisted driving by matching with a high-precision map. The points represent trajectory points of the vehicle, and the lines on two sides of the road represent vectorized lane lines. In this embodiment, accurate update processing on the high-precision map can be efficiently realized through the positioning processing on the rod-shaped objects.

In some embodiments, after the performing positioning processing on rod-shaped objects in the reference image based on matching points in which the epipolar line intersects with the fitting straight lines, to obtain recognition results of the rod-shaped objects in the reference image, the method further includes: constructing a sliding window based on the at least two frames of consecutive images; determining rod-shaped object recognition results corresponding to frames of images in the sliding window other than a first frame of image; constructing a loss function based on consistency of positions and orientations of rod-shaped objects in the rod-shaped object recognition results in a three-dimensional space; optimizing device pose data corresponding to the frames of images in the sliding window by using the loss function, to obtain pose optimization data; and optimizing the rod-shaped object recognition results corresponding to the frames of images based on the pose optimization data.

The sliding window refers to a sliding-window algorithm, in which operations are originally performed on a character string or array of a specific size instead of an entire character string or array, which reduces the complexity of the problem, thereby reducing the loop nesting depth. In some embodiments, it refers to that rod-shaped objects are followed by moving temporally consecutive image frames, and the following is not performed in adjacent frames, which effectively avoids the influence of missed detection of a single image on vectorization, thereby ensuring more reliable rod matching. The pose optimization process may be a calculation process of the bundle adjustment method, in which an attitude of a camera and three-dimensional coordinates of a measurement point are used as unknown parameters, and feature point coordinates detected on the image for forward intersection are used as observation data, to perform adjustment to obtain optimal camera parameters and world point coordinates, thereby achieving position optimization.

Figure 12:
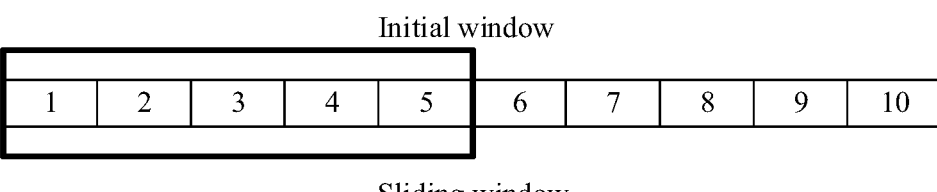
FIG. 12 is a schematic diagram of a sliding window according to some embodiments.

In some embodiments, the rod-shaped objects in the reference image can be positioned based on the reference image and the previous frame of image. In this way, it can be generalized to other images of the at least two frames of consecutive images, and by constructing a sliding window, the rod-shaped object recognition results corresponding to frames of images in the sliding window other than the first frame of image can be determined sequentially based on the foregoing recognition method. Subsequently, bundle adjustment method constraint processing may be performed on the rod-shaped objects in the sliding window, that is, a loss function is constructed according to consistency of positions and orientations of the rod-shaped objects in the sliding window in the three-dimensional space, to constrain the vehicle's pose, thereby obtaining more accurate local positioning. The optimization function may be as follows:

$$\min X = \sum_{k \in B} \left\| r_B(Z_{b_{k+1}}^{b_k}, X) \right\|_{P_{b_{k+1}}^{b_k}}^2 + \sum_{l,i} p(\left\| r_c(\hat{z}_l^{c_j}, X) \right\|_{P_l^{c_j}}^2)$$

where $$r_B\left(Z_{b_{k+1}}^{b_k}, X\right) \text{ and } r_c\left(\hat{z}_l^{c_j}, X\right)$$

respectively represent the preintegration constraint and vision constraint. The optimal pose can be obtained by minimizing the errors of vision and preintegration. For the sliding window in some embodiments, reference may be made to FIG. 12, in which image frames 1 to 5 are historical frames, and an image frame 6 represents the current frame. As time elapses, the first frame will be discarded and the sixth frame will be added simultaneously, to form a new sliding window. In this embodiment, coordinate system transformation of the matching points can be effectively realized through triangulation processing, thereby effectively recognizing accurate positions of rod-shaped objects in the world coordinate system, and ensuring the accuracy of rod-shaped object recognition and positioning.

Some embodiments further provide an application scenario, and the application scenario is applied to the foregoing method for recognizing a rod-shaped object in an image. In some embodiments, the method for recognizing a rod-shaped object in an image in this application scenario is as follows:

When the user needs to draw a high-precision map to realize autonomous driving through the map, the recognition of rod-shaped objects in an image may be used to assist in drawing and updating the rod-shaped objects in the high-precision map. First, the user may search for some consecutive images acquired by in-vehicle cameras in corresponding districts on the map. Subsequently, rod-shaped objects are drawn based on the map, and then the rod-shaped objects in the corresponding districts can be updated according to new images. In some embodiments, first, on a server side, rod-shaped object recognition processing is performed on a plurality of frames of consecutive images through an object detection network, to obtain a plurality of groups of detection points, and each rod-shaped object in the plurality of frames of consecutive images is determined according to the plurality of groups of detection points, to obtain initial rod-shaped object recognition results of the plurality of frames of consecutive images; and then at least two frames of consecutive images in which rod-shaped objects exist in the plurality of frames of consecutive images are determined based on the initial rod-shaped object recognition results, the at least two frames of consecutive images including a reference image and a previous frame of image of the reference image. In addition, device pose data corresponding to each frame of image may be determined, and speed data of the image acquisition device in a case of acquiring the plurality of frames of consecutive images and initial pose data of the image acquisition device corresponding to the plurality of frames of consecutive images are first obtained; and preintegration processing is performed on the speed data, to obtain the device pose data corresponding to each of the at least two frames of consecutive images. In some embodiments, position data and speed data corresponding to each of the at least two frames of consecutive images may be determined based on the initial pose data, the acceleration measurement value, and the acceleration offset; and angle data corresponding to each of the at least two frames of consecutive images may be determined based on the initial pose data, the angular velocity measurement value, and the angular velocity offset. Subsequently, a homography matrix is constructed based on device pose data corresponding to the at least two frames of consecutive images, and a detection point of the previous frame of image is projected to the reference image through the homography matrix, to obtain a detection point projection, the detection point being a point in the previous frame of image that is closest to a reference plane. For the process of constructing the homography matrix, rotation data and displacement data of the reference image and the previous frame of image relative to the reference plane may be first determined based on the device pose data corresponding to each of the at least two frames of consecutive images; and the homography matrix is constructed based on the rotation data and the displacement data. Subsequently, straight line fitting is performed on the initial rod-shaped object recognition results of the reference image by using a first-order function, to obtain the fitting straight lines corresponding to the initial rod-shaped object recognition results. Subsequently, distance data between the detection point projection and the fitting straight lines is determined; the distance data is screened by using a preset distance threshold, to obtain a matching group formed by a fitting straight line with a distance less than the preset distance threshold and the detection point projection, and an initial rod-shaped object recognition result corresponding to the fitting straight line in the matching group and an initial rod-shaped object recognition result corresponding to the detection point being the same rod-shaped object is determined. After the same rod-shaped object is obtained, the detection point of the same rod-shaped object in the previous frame of image that is closest to the reference plane may be projected to the reference image through epipolar line search, to obtain an epipolar line; then the matching points in which the epipolar line intersects with the fitting straight lines may be determined; triangulation processing is performed on the matching points, to obtain image acquisition device coordinate system positions of the matching points; and the image acquisition device coordinate system positions of the matching points are transferred to a world coordinate system, to obtain the recognition results of the rod-shaped objects in the reference image. In addition, to further optimize the processing, a sliding window may be constructed based on the at least two frames of consecutive images; rod-shaped object recognition results corresponding to frames of images in the sliding window other than a first frame of image may be determined; a loss function may be constructed based on consistency of positions and orientations of rod-shaped objects in the rod-shaped object recognition results in a three-dimensional space; device pose data corresponding to the frames of images in the sliding window may be optimized by using the loss function, to obtain pose optimization data; and the rod-shaped object recognition results corresponding to the frames of images may be optimized based on the pose optimization data.

Although the operations in the flowcharts involved in the foregoing embodiments are displayed sequentially according to instructions of arrows, these operations are not necessarily performed sequentially according to a sequence instructed by the arrows. Unless explicitly specified herein, execution of the operations is not strictly limited in the sequence, and the operations may be performed in other sequences. In addition, at least some operations in the flowcharts involved in the foregoing embodiments may include a plurality of operations or a plurality of stages. The operations or the stages are not necessarily performed at the same moment, but may be performed at different moments. The operations or the stages are not necessarily performed in sequence, but may be performed in turn or alternately with another operation or at least some of operations or stages of the another operation.

Some embodiments further provide an apparatus for recognizing a rod-shaped object in an image configured to implement the foregoing method for recognizing a rod-shaped object in an image. The implementation solution provided by this apparatus to resolve the problem is similar to the implementation solution recorded in the foregoing method. Therefore, for specific limitations in the one or more embodiments of the apparatus for recognizing a rod-shaped object in an image provided below, reference may be made to the limitations on the method for recognizing a rod-shaped object in an image above, and details are not described herein again.

Figure 13:
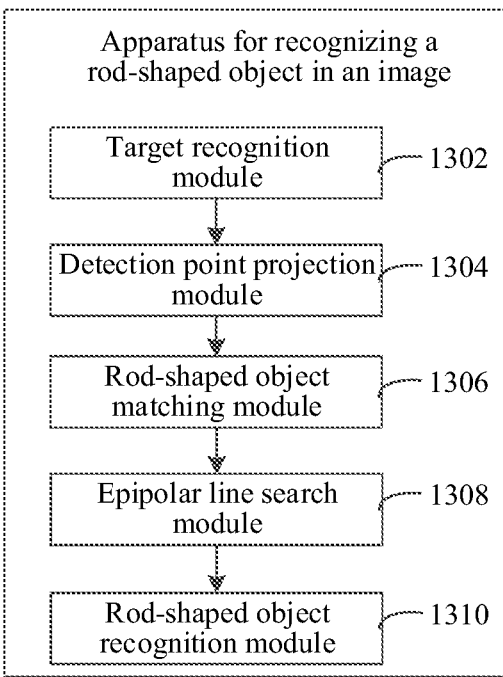
FIG. 13 is a structural block diagram of an apparatus for recognizing a rod-shaped object in an image according to some embodiments.

In some embodiments, as shown in FIG. 13, an apparatus for recognizing a rod-shaped object in an image is provided, including a target recognition module 1302, configured to determine, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images including a reference image and a previous frame of image of the reference image;

a detection point projection module 1304, configured to determine device pose data corresponding to a case that an image acquisition device acquires the at least two frames of consecutive images, and project a detection point of the previous frame of image to the reference image based on the device pose data, to obtain a detection point projection, the detection point being a point in the previous frame of image that is closest to a reference plane, the reference plane existing in both the reference image and the previous frame of image;

a rod-shaped object matching module 1306, configured to recognize the same rod-shaped object in the reference image and the previous frame of image based on fitting straight lines of initial rod-shaped object recognition results of the reference image and the detection point projection;

an epipolar line search module 1308, configured to project the detection point to the reference image through epipolar line search, to obtain an epipolar line; and a rod-shaped object recognition module 1310, configured to perform positioning processing on rod-shaped objects in the reference image based on matching points in which the epipolar line intersects with the fitting straight lines, to obtain recognition results of the rod-shaped objects in the reference image.

In some embodiments, the apparatus further includes an initial detection module, configured to: perform rod-shaped object recognition processing on the plurality of frames of consecutive images, to obtain a plurality of groups of detection points; and determine each rod-shaped object in the plurality of frames of consecutive images according to the plurality of groups of detection points, to obtain the initial rod-shaped object recognition results of the plurality of frames of consecutive images.

In some embodiments, the detection point projection module 1304 is further configured to: obtain device pose data corresponding to each frame of image corresponding to the case that the image acquisition device acquires the at least two frames of consecutive images; construct a homography matrix based on the device pose data corresponding to each frame of image; and project the detection point to the reference image through the homography matrix, to obtain the detection point projection.

In some embodiments, the detection point projection module 1304 is further configured to: obtain speed data of the image acquisition device in a case of acquiring the plurality of frames of consecutive images and initial pose data of the image acquisition device; and perform preintegration processing on the speed data based on the initial pose data, to obtain the device pose data corresponding to each of the at least two frames of consecutive images.

In some embodiments, the speed data includes an acceleration measurement value, an angular velocity measurement value, an acceleration offset, and an angular velocity offset, and the pose data includes position data, speed data, and angle data; and the detection point projection module 1304 is further configured to: determine position data and speed data corresponding to each of the at least two frames of consecutive images based on the initial pose data, the acceleration measurement value, and the acceleration offset; and determine angle data corresponding to each of the at least two frames of consecutive images based on the initial pose data, the angular velocity measurement value, and the angular velocity offset.

In some embodiments, the detection point projection module 1304 is further configured to: determine rotation data and displacement data of the reference image and the previous frame of image relative to the reference plane based on the device pose data corresponding to each frame of image; and construct the homography matrix based on the rotation data and the displacement data.

In some embodiments, the apparatus further includes a straight line fitting module, configured to: perform straight line fitting on the initial rod-shaped object recognition results of the reference image by using a first-order function, to obtain the fitting straight lines corresponding to the initial rod-shaped object recognition results.

In some embodiments, the rod-shaped object matching module 1304 is further configured to: determine distance data between the fitting straight lines of the initial rod-shaped object recognition results of the reference image and the detection point projection; and screen the distance data by using a preset distance threshold, to obtain a matching group formed by a fitting straight line with a distance less than the preset distance threshold and the detection point projection, and determine that an initial rod-shaped object recognition result corresponding to the fitting straight line in the matching group and an initial rod-shaped object recognition result corresponding to the detection point is the same rod-shaped object.

In some embodiments, the rod-shaped object recognition module 1308 is further configured to: determine the matching points in which the epipolar line intersects with the fitting straight lines; perform triangulation processing on the matching points, to obtain image acquisition device coordinate system positions of the matching points; and transfer the image acquisition device coordinate system positions of the matching points to a world coordinate system, to obtain the recognition results of the rod-shaped objects in the reference image.

In some embodiments, the apparatus further includes a map update module, configured to: search for positioning data corresponding to a case that the image acquisition device acquires the plurality of frames of consecutive images; determine image capture positions based on the positioning data; search for a high-precision map of the image capture positions; determine a newly added rod-shaped object based on the high-precision map and the recognition results of the rod-shaped objects in the reference image; and update the newly added rod-shaped object to the high-precision map.

In some embodiments, the apparatus further includes a position optimization module, configured to: construct a sliding window based on the at least two frames of consecutive images; determine rod-shaped object recognition results corresponding to frames of images in the sliding window other than a first frame of image; construct a loss function based on consistency of positions and orientations of rod-shaped objects in the rod-shaped object recognition results in a three-dimensional space; optimize device pose data corresponding to the frames of images in the sliding window by using the loss function, to obtain pose optimization data; and optimize the rod-shaped object recognition results corresponding to the frames of images based on the pose optimization data.

The modules in the foregoing apparatus for recognizing a rod-shaped object in an image may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a server, and an internal structure diagram thereof may be shown in FIG. 14. The computer device includes a processor, a memory, an input/output (I/O) interface, and a communication interface. The processor, the memory, and the input/output interface are connected to each other by a system bus, and the communication interface is connected to the system bus by the input/output interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store data related to rod-shaped object recognition. The input/output interface of the computer device is configured to exchange information between the processor and an external device. The communication interface of the computer device is configured to communicate with an external terminal through a network connection. The computer-readable instructions, when executed by the processor, implement a method for recognizing a rod-shaped object in an image.

Figure 14:
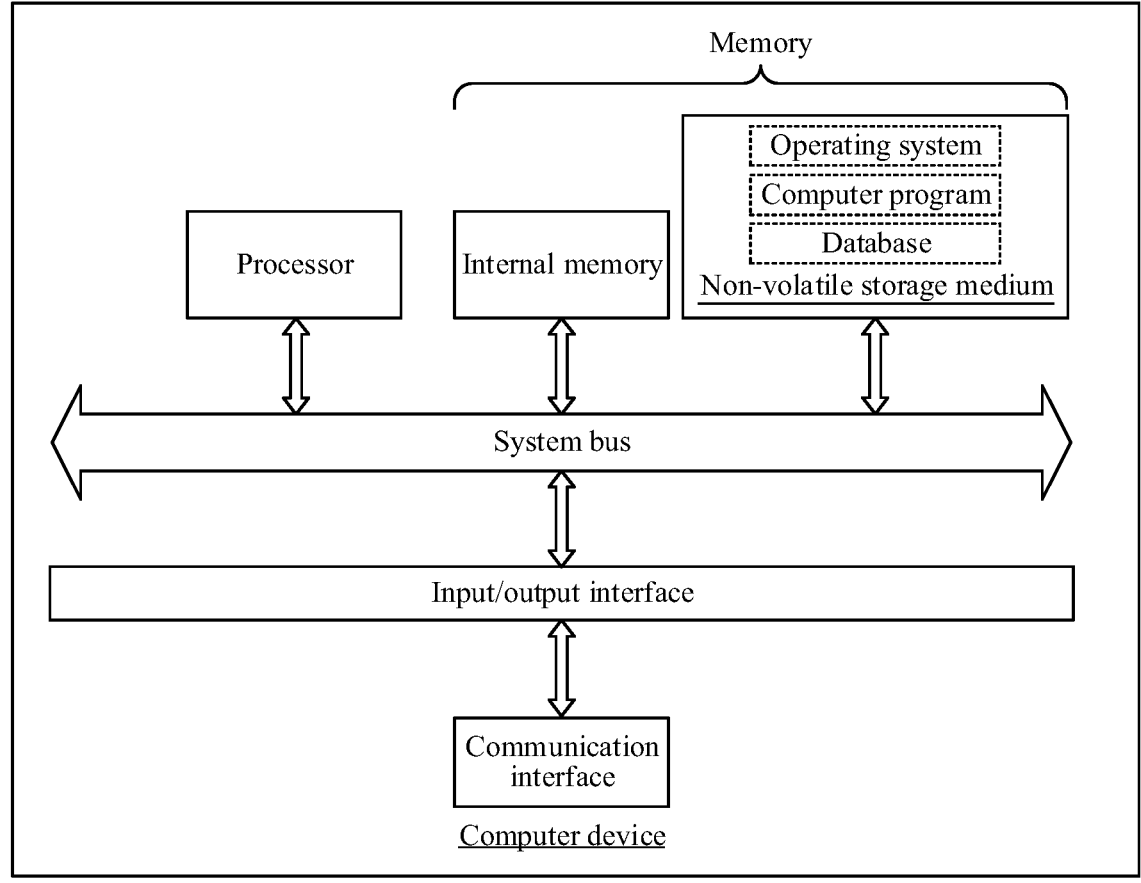
FIG. 14 is a diagram of an internal structure of a computer device according to some embodiments.

A person skilled in the art may understand that, the structure shown in FIG. 14 is only a block diagram of a partial structure related to the solution of some embodiments, and does not limit the computer device to which the solution is applied. In some embodiments, the specific computer device may include more components or fewer components than those shown in the figure, or some components may be combined, or a different component deployment may be used.

In some embodiments, a computer device is further provided, including a memory and a processor, the memory storing computer-readable instructions, the processor, when executing the computer-readable instructions, implementing the operations in the foregoing method embodiments.

In some embodiments, a computer-readable storage medium is provided, storing computer-readable instructions, the computer-readable instructions, when executed by a processor, implementing the operations in the foregoing method embodiments.

In some embodiments, a computer-readable instruction product or computer-readable instructions are provided. The computer-readable instruction product or the computer-readable instructions include computer instructions, and the computer instructions are stored in a computer-readable storage medium. The processor of the computer device reads the computer instructions from the computer-readable storage medium, and the processor executes the computer instructions, to cause the computer device to perform the operations in the method embodiments.

Both user information (including but not limited to user device information and user personal information) and data (including but not limited to data used for analysis, stored data, and displayed data) involved in some embodiments are information and data authorized by the user or fully authorized by all parties, and the collection, use, and processing of relevant data need to comply with relevant laws, regulations and standards of relevant countries and regions.

A person of ordinary skill in the art may understand that all or some procedures in the method in the foregoing embodiments may be implemented by computer-readable instructions instructing related hardware. The computer-readable instructions may be stored in a non-volatile computer-readable storage medium, and when the computer-readable instructions are executed, the procedures in the foregoing method embodiments may be implemented. Any reference to a memory, a database, or another medium used in various embodiments may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, and the like. The volatile memory may include a random access memory (RAM), an external cache, or the like. For the purpose of description instead of limitation, the RAM is available in a plurality of forms, such as a static RAM (SRAM) or a dynamic RAM (DRAM). The databases provided in some embodiments may include at least one of relational databases or non-relational databases. The non-relational databases may include blockchain-based distributed databases and the like, and are not limited thereto. The processors involved in some embodiments may be general-purpose processors, central processing units, graphics processors, digital signal processors, programmable logic devices, quantum computing-based data processing logic devices, and the like, and are not limited thereto.

Technical features of the foregoing embodiments may be combined in different manners to form other embodiments. For concise description, not all possible combinations of the technical features in the embodiments are described. However, provided that combinations of the technical features do not conflict with each other, the combinations of the technical features are considered as falling within the scope of the disclosure.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A method for recognizing a rod-shaped object in an image, performed by a computer device, comprising:

determining, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images comprising a reference image and a previous frame of image of the reference image;

determining device pose data based on an image acquisition device acquiring the at least two frames of consecutive images, and projecting a detection point of the previous frame of image to the reference image based on the device pose data to obtain a detection point projection, the detection point being a point in the previous frame of image that is closest to a reference plane, the reference plane existing in both the reference image and the previous frame of image;

recognizing the same rod-shaped object in the reference image and the previous frame of image based on fitting straight lines of initial rod-shaped object recognition results of the reference image and the detection point projection;

projecting the detection point to the reference image through epipolar line search, to obtain an epipolar line in the reference image; and performing positioning processing on rod-shaped objects in the reference image based on matching points in which the epipolar line intersects with the fitting straight lines, to obtain recognition results of the rod-shaped objects in the reference image.

2. The method according to claim 1, wherein before determining the at least two frames of consecutive images in which rod-shaped objects exist in the plurality of frames of consecutive images, the method further comprises:

performing rod-shaped object recognition processing on the plurality of frames of consecutive images, to obtain a plurality of groups of detection points; and determining each rod-shaped object in the plurality of frames of consecutive images according to the plurality of groups of detection points to obtain the initial rod-shaped object recognition results of the plurality of frames of consecutive images.

3. The method according to claim 1, wherein the determining device pose data comprises:

obtaining device pose data corresponding to each frame of image based on the image acquisition device acquiring the at least two frames of consecutive images;

constructing a homography matrix based on the device pose data corresponding to each frame of image; and projecting the detection point to the reference image through the homography matrix, to obtain the detection point projection.

4. The method according to claim 3, wherein the obtaining device pose data comprises:

obtaining speed data of the image acquisition device based on acquiring the plurality of frames of consecutive images and initial pose data of the image acquisition device; and performing preintegration processing on the speed data based on the initial pose data, to obtain the device pose data corresponding to each of the at least two frames of consecutive images.

5. The method according to claim 4, wherein the speed data comprises an acceleration measurement value, an angular velocity measurement value, an acceleration offset, and an angular velocity offset, and the pose data comprises position data, speed data, and angle data; and the performing preintegration processing comprises:

determining the position data and the speed data corresponding to each of the at least two frames of consecutive images based on the initial pose data, the acceleration measurement value, and the acceleration offset; and determining the angle data corresponding to each of the at least two frames of consecutive images based on the initial pose data, the angular velocity measurement value, and the angular velocity offset.

6. The method according to claim 3, wherein the constructing comprises:

determining rotation data and displacement data of the reference image and the previous frame of image relative to the reference plane based on the device pose data corresponding to each frame of image; and constructing the homography matrix based on the rotation data and the displacement data.

7. The method according to claim 1, wherein before the recognizing, the method further comprises:

performing straight line fitting on the initial rod-shaped object recognition results of the reference image by using a first-order function, to obtain the fitting straight lines corresponding to the initial rod-shaped object recognition results.

8. The method according to claim 1, wherein the recognizing comprises:

determining distance data between the fitting straight lines of the initial rod-shaped object recognition results of the reference image and the detection point projection; and screening the distance data by using a preset distance threshold, to obtain a matching group formed by a fitting straight line with a distance less than the preset distance threshold and the detection point projection, and determining that an initial rod-shaped object recognition result corresponding to the fitting straight line in the matching group and an initial rod-shaped object recognition result corresponding to the detection point is the same rod-shaped object.

9. The method according to claim 1, wherein the performing comprises:

determining the matching points in which the epipolar line intersects with the fitting straight lines;

performing triangulation processing on the matching points, to obtain image acquisition device coordinate system positions of the matching points; and transferring the image acquisition device coordinate system positions of the matching points to a world coordinate system, to obtain the recognition results of the rod-shaped objects in the reference image.

10. The method according to claim 9, further comprising:

searching for positioning data based on the image acquisition device acquiring the plurality of frames of consecutive images;

determining image capture positions based on the positioning data;

searching for a high-precision map of the image capture positions;

determining a newly added rod-shaped object based on the high-precision map and the recognition results of the rod-shaped objects in the reference image; and updating the newly added rod-shaped object to the high-precision map.

11. The method according to claim 1, wherein after the performing positioning, the method further comprises:

constructing a sliding window based on the at least two frames of consecutive images;

determining rod-shaped object recognition results corresponding to frames of images in the sliding window other than a first frame of image;

constructing a loss function based on consistency of positions and orientations of rod-shaped objects in the rod-shaped object recognition results in a three-dimensional space;

optimizing device pose data corresponding to the frames of images in the sliding window by using the loss function, to obtain pose optimization data; and optimizing the rod-shaped object recognition results corresponding to the frames of images based on the pose optimization data.

12. An apparatus for recognizing a rod-shaped object in an image, comprising:

at least one memory configured to store program code; and at least one processor configured to read the program code and operate as instructed by the program code, the program code comprising:

target recognition code configured to cause at least one of the at least one processor to determine, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images comprising a reference image and a previous frame of image of the reference image;

detection point projection code configured to cause at least one of the at least one processor to determine device pose data based on an image acquisition device acquiring the at least two frames of consecutive images, and project a detection point of the previous frame of image to the reference image based on the device pose data to obtain a detection point projection, the detection point being a point in the previous frame of image that is closest to a reference plane, the reference plane existing in both the reference image and the previous frame of image;

rod-shaped object matching code configured to cause at least one of the at least one processor to recognize the same rod-shaped object in the reference image and the previous frame of image based on fitting straight lines of initial rod-shaped object recognition results of the reference image and the detection point projection;

epipolar line search code configured to cause at least one of the at least one processor to project the detection point to the reference image through epipolar line search, to obtain an epipolar line in the reference image; and rod-shaped object recognition code configured to cause at least one of the at least one processor to perform positioning processing on rod-shaped objects in the reference image based on matching points in which the epipolar line intersects with the fitting straight lines, to obtain recognition results of the rod-shaped objects in the reference image.

13. The apparatus according to claim 12, wherein the program code further comprises initial detection code configured to cause at least one of the at least one processor to:

perform rod-shaped object recognition processing on the plurality of frames of consecutive images, to obtain a plurality of groups of detection points; and determine each rod-shaped object in the plurality of frames of consecutive images according to the plurality of groups of detection points, to obtain the initial rod-shaped object recognition results of the plurality of frames of consecutive images.

14. The apparatus according to claim 12, wherein the detection point projection code is further configured to cause at least one of the at least one processor to:

obtain the device pose data corresponding to each frame of image based on the image acquisition device acquiring the at least two frames of consecutive images;

construct a homography matrix based on the device pose data corresponding to each frame of image; and project the detection point to the reference image through the homography matrix, to obtain the detection point projection.

15. The apparatus according to claim 14, wherein the detection point projection code is further configured to cause at least one of the at least one processor to:

obtain speed data of the image acquisition device based on acquiring the plurality of frames of consecutive images and initial pose data of the image acquisition device; and perform preintegration processing on the speed data based on the initial pose data, to obtain the device pose data corresponding to each of the at least two frames of consecutive images.

16. The apparatus according to claim 15, wherein the speed data comprises an acceleration measurement value, an angular velocity measurement value, an acceleration offset, and an angular velocity offset, and the pose data comprises position data, speed data, and angle data; and the detection point projection code is further configured to cause at least one of the at least one processor to:

determine the position data and the speed data corresponding to each of the at least two frames of consecutive images based on the initial pose data, the acceleration measurement value, and the acceleration offset; and determine the angle data corresponding to each of the at least two frames of consecutive images based on the initial pose data, the angular velocity measurement value, and the angular velocity offset.

17. The apparatus according to claim 14, wherein the detection point projection code is further configured to cause at least one of the at least one processor to:

determine rotation data and displacement data of the reference image and the previous frame of image relative to the reference plane based on the device pose data corresponding to each frame of image; and construct the homography matrix based on the rotation data and the displacement data.

18. A non-transitory computer-readable storage medium storing computer code which, when executed by at least one processor, causes the at least one processor to at least:

determine, based on initial rod-shaped object recognition results obtained by performing rod-shaped object detection on a plurality of frames of consecutive images, at least two frames of consecutive images in which rod-shaped objects exist in the plurality of frames of consecutive images, the at least two frames of consecutive images comprising a reference image and a previous frame of image of the reference image;

determine device pose data based on an image acquisition device acquiring the at least two frames of consecutive images, and project a detection point of the previous frame of image to the reference image based on the device pose data, to obtain a detection point projection, the detection point being a point in the previous frame of image that is closest to a reference plane, the reference plane existing in both the reference image and the previous frame of image;

recognize the same rod-shaped object in the reference image and the previous frame of image based on fitting straight lines of initial rod-shaped object recognition results of the reference image and the detection point projection;

project the detection point to the reference image through epipolar line search to obtain an epipolar line in the reference image; and perform positioning processing on rod-shaped objects in the reference image based on matching points in which the epipolar line intersects with the fitting straight lines, to obtain recognition results of the rod-shaped objects in the reference image.

19. The non-transitory computer-readable storage medium according to claim 18, wherein before the determine the at least two frames of consecutive images in which rod-shaped objects exist in the plurality of frames of consecutive images, the storing code causes the at least one processor to at least:

perform rod-shaped object recognition processing on the plurality of frames of consecutive images, to obtain a plurality of groups of detection points; and determine each rod-shaped object in the plurality of frames of consecutive images according to the plurality of groups of detection points to obtain the initial rod-shaped object recognition results of the plurality of frames of consecutive images.

20. The non-transitory computer-readable storage medium according to claim 18, wherein the determine device pose data comprises:

obtaining device pose data corresponding to each frame of image based on the image acquisition device acquiring the at least two frames of consecutive images;

constructing a homography matrix based on the device pose data corresponding to each frame of image; and projecting the detection point to the reference image through the homography matrix, to obtain the detection point projection.

* * * * *